Figure 1:
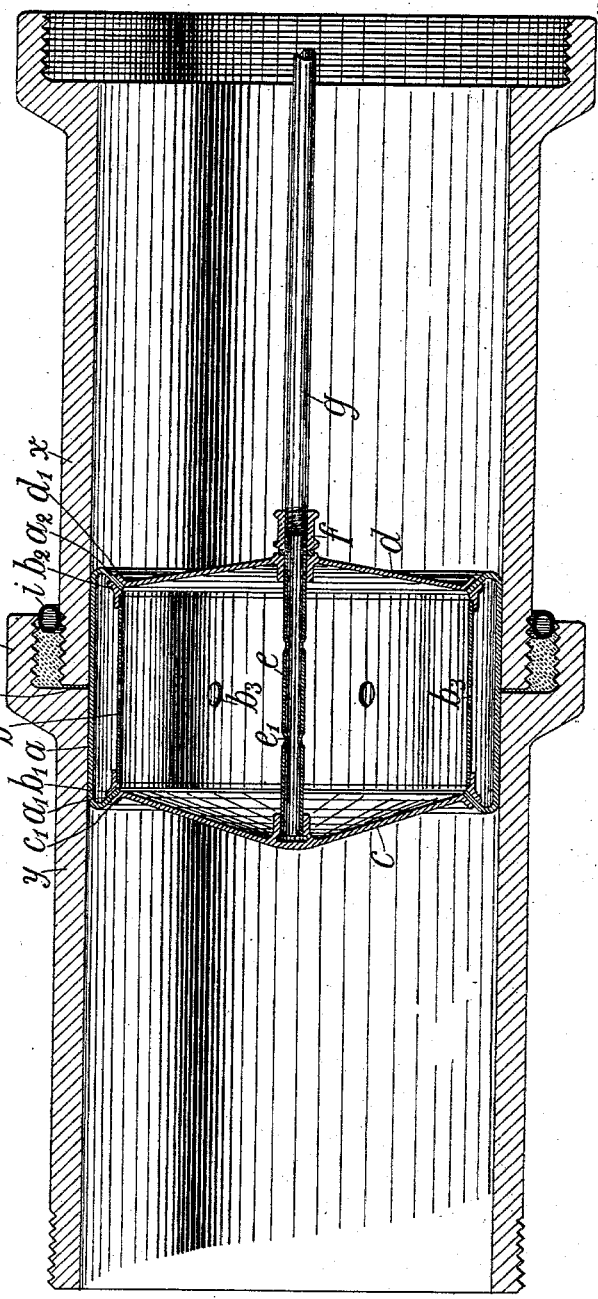

No. 753,464. PATENTED MAR. 1, 1904.
H. BEINHAUER.
APPARATUS FOR TIGHTENING SOCKET PIPE CONNECTIONS.
APPLICATION FILED APR. 10, 1903.
NO MODEL. 2 SHEETS—SHEET 1.

WITNESSES: Ellis Owen. John Smith.

INVENTOR
H. Beinhauer
BY
W. E. Evans
ATTORNEY

No. 753,464. PATENTED MAR. 1, 1904.
H. BEINHAUER.
APPARATUS FOR TIGHTENING SOCKET PIPE CONNECTIONS.
APPLICATION FILED APR. 10, 1903.
NO MODEL. 2 SHEETS—SHEET 2.
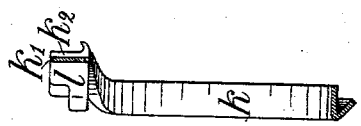
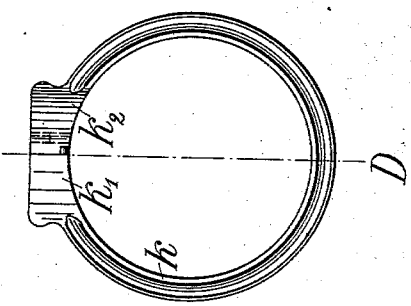
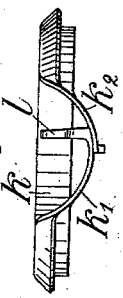
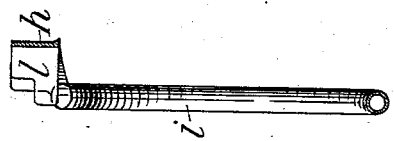
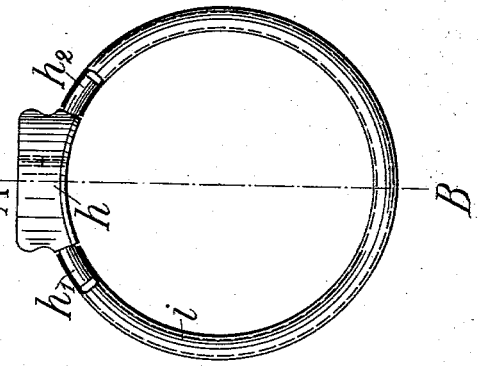
WITNESSES:
Ellis Owen
John Smith
INVENTOR
H. Beinhauer
BY
W. E. Evans
ATTORNEY No. 753,464. Patented March 1, 1904.

UNITED STATES PATENT OFFICE.

HUGO BEINHAUER, OF BIELEFELD, GERMANY.

APPARATUS FOR TIGHTENING SOCKET-PIPE CONNECTIONS.

SPECIFICATION forming part of Letters Patent No. 753,464, dated March 1, 1904.

Application filed April 10, 1903. Serial No. 152,031. (No model.)

*To all whom it may concern:*

Be it known that I, HUGO BEINHAUER, a subject of the German Emperor, residing at 66ª Rohrteichstrasse, Bielefeld, in the Kingdom of Prussia and Empire of Germany, have invented certain new and useful Improvements in Apparatus for Tightening Socket-Pipe Connections, of which the following is a specification.

Hitherto socket-pipe connections have generally been made in such manner that the spigot of one pipe is surrounded with an impregnated hemp rope and mounted in the socket of another pipe, that the rope is then pressed into the bottom of the socket and the annular space between the spigot and the socket is closed by a clay luting or a spring-ring, and that through a hole provided in the luting or ring the proper tightening material, such as lead for iron pipes and asphalt cement for earthenware pipes, is poured into said space. This procedure has the following disadvantages:

First. The hemp rope does not present a sufficient security for the coaxial placement of the pipes and against the leakage of the tightening material into the interior of the pipes. The formation of shoulders and crusts of tightening material at the butts of the pipes is therefore inevitable. These irregularities in the interior of the pipes favor the formation or deposits, the consequences of which are that in water-pipes the water passing through is contaminated and in drain-pipes stoppages result.

Second. The butt-joints between the connected pipes are open, and therefore the liquids conveyed in the pipes find access to the hemp ropes, so that the ropes gradually rot and in their place hollow spaces are formed in the sockets, which facilitate the deposit of detritus, from which in particular cases, especially in water-pipes, many dangerous germs may arise.

Third. The proper tightening material fills only the front part of the socket-annulus in the form of a narrow ring, which after the hemp rope is destroyed does not afford a sufficient security for a durable tight joint as against inward and outward stresses or other prejudicial influences.

Fourth. The closure of the socket-annulus by a clay luting or spring-ring is inconvenient, unsafe, and requires considerable time to effect.

Fifth. The process can only be carried into effect by skilled persons and that with the greatest care and attention.

The object of my invention is an apparatus designed to avoid these disadvantages. This apparatus consists of an expansible cylindrical body which may be introduced into the interior of the pipes at the place of connection and a rubber ring which may be mounted in the socket-annulus. By means of the said cylindrical body the pipes may be placed coaxially without the employment of hemp ropes or the like, and the butt-joints are tightly closed for the pouring of the tightening material into the socket, so that the leakage of any of the tightening material into the interior of the pipe is prevented. In employing this body the tightening material completely fills the butt-joints. Thus the cylindrical body enables socket-pipe conduits to be made without grooves and with a perfectly even surface within, which conduits thus fulfil the highest technical and hygienic requirements. By means of the rubber ring the socket-annulus may be easily, quickly, and safely closed for the pouring of the tightening material, the rubber ring being held fast by the frictional resistance at the faces of the socket, and therefore does not require to be clamped by any mechanical device, as is required with a spring-ring.

In employing this apparatus the process of making socket-pipe connections is very simple, so that it can be quickly and positively executed by any person without special experience.

The apparatus is illustrated in the accompanying drawings, in which—

Figure 1 illustrates the expansible cylindrical body and the rubber ring in axial section. Figs. 2, 3, and 4 represent in front part sectional elevation, plan, and sectional side elevation on the line A B, Fig. 2, one form of rubber ring that may be employed; and Figs. 5, 6, and 7 represent in front elevation, plan, and sectional side elevation on the line C D, Fig. 5, a modified form of rubber ring.

The expansible cylindrical body, Fig. 1, consists of a rubber cover $a$, a coaxial sheet-metal cylinder $b$ within the cover, two side plates $c$ and $d$, and a central tube $e$. One end of the latter is fixedly connected with the side plate $c$, while the other end is loosely carried through the side plate $d$ and provided on the outside with a screw-thread, upon which a screwed socket $f$ is mounted. By means of this socket, which lies in contact with the side plate $d$, the turned-up edges $a'$ and $a^2$ of the cover $a$ are tightly clamped between the conical edges $b'$ and $b^2$ of the sheet-metal cylinder $b$ and the conical edges $c'$ and $d'$ of the respective side plates $c$ and $d$, so that an airtight closed space is formed. The cylinder $b$ and the tube $e$ are provided with holes $b^3$ and $e'$, respectively, through which air or water under pressure may be forced into said space by a pump to be connected with the tube $g$.

In the modification illustrated in Figs. 2 to 4 as designed for pipes of relatively great dimensions the rubber ring $i$ has a circular section, is hollow, and may be filled with water. In the modification illustrated in Figs. 5 to 7, as designed for pipes of smaller dimensions, the rubber ring $k$ has an angular section. In both modifications a pouring-mouth is provided with the ring. In the modification illustrated in Figs. 2 to 4 this mouth consists of a removable part $h$, which may be used for a number of rings, and the lateral cylindrical projections $h'$ and $h^2$ of which fit within the ends of the hollow ring $i$. In the modification illustrated in Figs. 5 to 7 the pouring-mouth is formed by the lip-shaped and turned up edges $k'$ and $k^2$ of the ring $k$, which ends engage one over the other, as illustrated. This pouring-mouth is divided into two parts of different size by a tongue $l$, through the larger part of which the tightening material is poured into the socket-annulus and through the smaller one of which the air is allowed to escape from said annulus.

The apparatus is employed as follows: The expansible cylindrical body, Fig. 1, is dipped in water and is then introduced into the pipe $x$ which is to be connected to such an extent that it projects half-way out from the end of this pipe. The body is then inflated by air or water under pressure in such manner that its one half is fixedly held within the pipe $x$ and its other half forms a slightly-elastic guiding-boss for this pipe. The pipe $x$ is now introduced into the socket $y'$ of the pipe $y$, so that the boss engages within this pipe, whereby both pipes are brought into perfect coincidence without any adjustment. After the pipe $x$ thus connected is stuffed under and brought into the position prescribed by the descent and the direction the expansible body is further inflated, whereby the butt-joint $z$ between the pipes is tightly closed from the interior. Afterward the rubber ring $i$, having in the first instance been dipped in water or been filled with water, is laid round the pipe $x$ and is introduced within the socket-annulus in order that the latter may be tightly closed from the exterior. The tightening material, which shall not be too hot, is now poured in through the larger part of the mouth $h$, whereby attention has to be directed that the smaller part is left free in order that air may freely escape from the socket-annulus. After one to two minutes for cooling and hardening the tightening material in the butt-joint $z$, which may be forwarded by pouring cold water over the socket, the pressure in the cylindrical body is relieved, and this latter is removed out of the pipe. The rubber ring has to be left in somewhat longer. The dipping of the cylindrical body and ring in water and the filling of the hollow ring with water before using is an effective means for protecting the rubber against the hot tightening material. The cylindrical body and the rubber ring may instead be provided with an asbestos covering when the apparatus is used for tightening the joints of iron pipes by means of lead.

What I claim as my invention, and desire to secure by Letters Patent, is—

1. Apparatus for tightening socket-pipe connections consisting of a pneumatic expansible cylindrical body which may be introduced into the interior of the respective pipes at the place of connection, and of a rubber ring with a pouring-mouth which ring may be introduced into the mouth of the annulus between the spigot of the one pipe and the socket of the other one, substantially as described.

2. Apparatus for tightening socket-pipe connections consisting of an expansible cylindrical body which may be introduced into the interior of the respective pipes at the place of connection, said body being composed of a metallic cylinder with conical edges, side plates with peripheral conical edges, and an outer flexible cover, the edges of which are engaged between the conical edges of the metal cylinder and the peripheral conical edges of the side plates aforesaid, substantially as described.

3. Apparatus for tightening socket-pipe connections consisting of an expansible cylindrical body which may be introduced into the interior of the respective pipes at the place of connection, said body being composed of a metallic cylinder with conical edges, side plates with peripheral conical edges, an outer flexible cover, the edges of which are engaged between the conical edges of the metal cylinder and the peripheral conical edges of the side plates aforesaid, and a screwed socket for forcing one of said side plates inwardly for effectively clamping the edges of said cover, substantially as described.

4. Apparatus for tightening socket-pipe connections consisting of an expansible cylindrical body which may be introduced into the interior of the respective pipes at the place of connection, said body being composed of a perforated metallic cylinder with conical edges, side plates with peripheral conical edges, an outer flexible cover, the edges of which are engaged between the conical edges of the metal cylinder and the peripheral conical edges of the side plates aforesaid, and means for supplying fluid-pressure into said metal cylinder and said cover, substantially as described.

5. Apparatus for tightening socket-pipe connections consisting of an expansible cylindrical body which may be introduced into the interior of the respective pipes at the place of connection, said body being composed of a perforated metal cylinder with conical edges, side plates with peripheral conical edges, an outer flexible cover, the edges of which are engaged between the conical edges of the metal cylinder and peripheral conical edges of the side plates aforesaid, a perforated tube upon which said side plates are mounted, and a socket screwed upon the end of said tube for pressing one of said side plates inwardly, substantially as described.

6. Apparatus for tightening socket-pipe connections consisting of a pneumatic expansible cylindrical body which may be introduced into the interior of the respective pipes at the place of connection, a rubber ring which may be introduced into the mouth of the annulus between the spigot of the one pipe and the socket of the other one, a pouring-mouth on said ring, and a tongue dividing said pouring-mouth into two compartments communicating on each side of said tongue with the said annulus, substantially as described.

7. Apparatus for tightening socket-pipe connections consisting of a pneumatic expansible cylindrical body which may be introduced into the interior of the respective pipes at the place of connection, a hollow rubber ring which may be introduced into the mouth of the annulus between the spigot of the one pipe and the socket of the other one, a pouring-mouth on said ring, and a tongue dividing said pouring-mouth into two compartments communicating on each side of said tongue with the said annulus, substantially as described.

8. Apparatus for tightening socket-pipe connections consisting of an expansible cylindrical body which may be introduced into the interior of the respective pipes at the place of connection, a rubber ring which may be introduced into the mouth of the annulus between the spigot of the one pipe and the socket of the other one, and a pouring-mouth on said ring said pouring-mouth being separable from the ring and being provided with projections fitting in the hollow extremities of the ring, substantially as described.

In testimony whereof I have signed my name to this specification in the presence of two subscribing witnesses.

HUGO BEINHAUER.

Witnesses:
  LEONORE RASCH,
  C. C. STEVENSON.